Patented June 23, 1925.

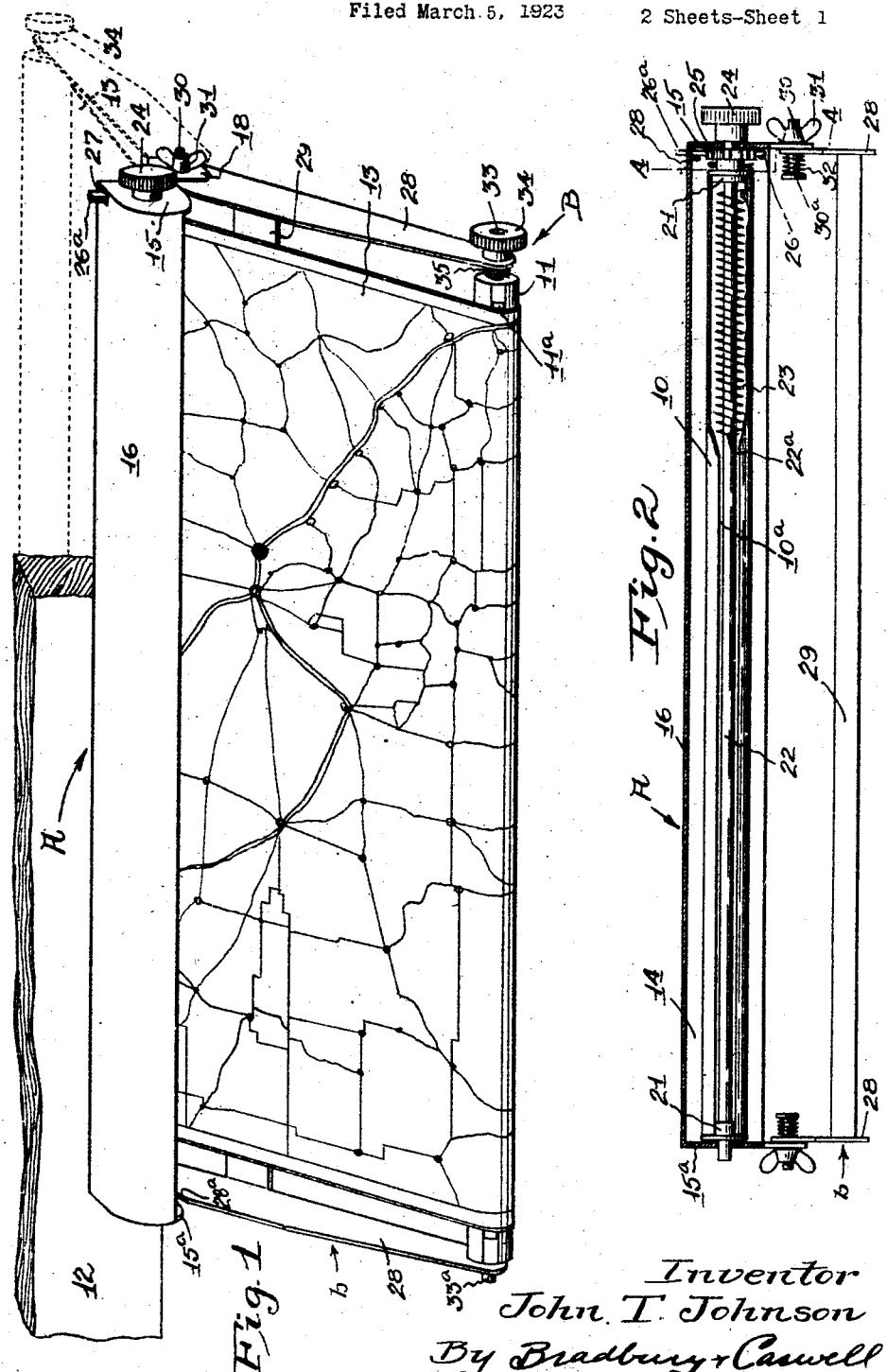

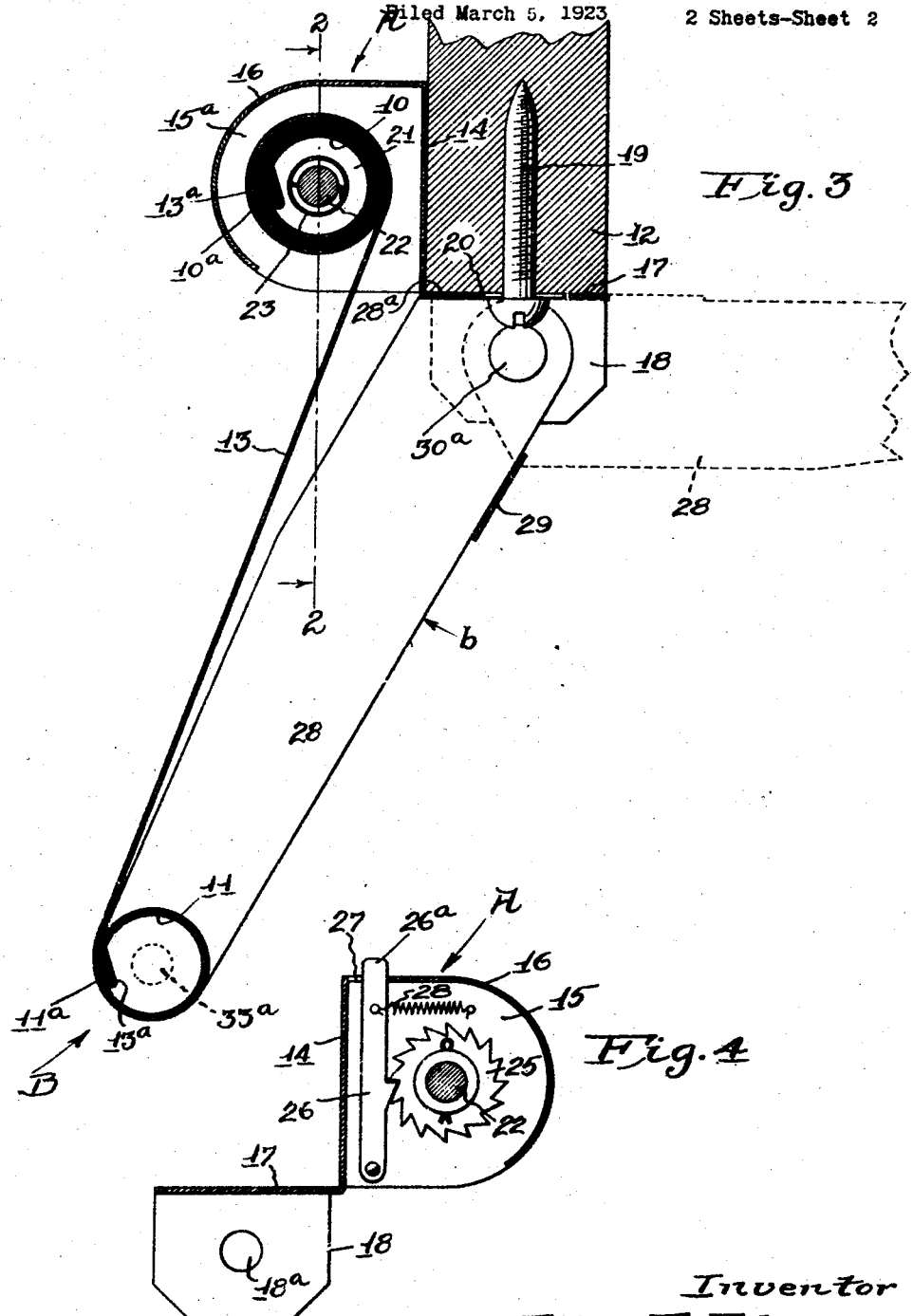

1,543,474

UNITED STATES PATENT OFFICE.

JOHN T. JOHNSON, OF LENGBY, MINNESOTA.

MAP HOLDER.

Application filed March 5, 1923. Serial No. 622,844.

*To all whom it may concern:*

Be it known that I, JOHN T. JOHNSON, a citizen of the United States, residing at Lengby, in the county of Polk and State of Minnesota, have invented a new and useful Map Holder, of which the following is a specification.

My invention relates to improvements in map holders for use particularly, though not exclusively, in holding road maps in automobiles.

One object is to provide a simple, durable and inexpensive device of this kind designed for convenient attachment to the instrument board of an automobile or other suitable support and having a spring actuated roller adapted to wind in a map and yieldingly permit of the unwinding of the same therefrom.

Another object is to supply a device of this nature having an adjustable reel to take up and let out a map wound on the spring actuated roller, whereby any desired portion of the map may be displayed for convenient observation.

A further object is to provide a device, as above, designed to conveniently and detachably receive flexible maps, bound at their ends with the ordinary metallic binding strips.

An additional object is to make provision in a device of this kind for releasing the roller spring, whereby a ready exchange of maps can be accomplished and, further, to supply means for initially turning the roller to perfect the attachment of a map thereto and then re-tensioning the roller spring.

With the foregoing and other objects in view, which will appear in the following description, the invention resides in the novel combination and arrangement of parts and in the details of construction hereinafter described and claimed.

In the drawings, Fig. 1 is a perspective view of a map holder embodying my invention, the same being illustrated as applied to an instrument board of an automobile and equipped with a road map; Fig. 2 is a sectional view taken as on the line 2—2 of Fig. 3, a fragment only of the reel being shown and the map being omitted; Fig. 3 is an enlarged vertical sectional view of the structure shown in Fig. 1 and Fig. 4 is an enlarged sectional view in detail taken on the line 4—4 of Fig. 2.

Referring to the drawings wherein similar reference characters are employed to designate similar parts throughout the several views, I have used the letter A to indicate a body structure or housing and the numeral 10 to designate a roller within said housing. A reel B including a frame *b* hinged to the housing A is fitted with a winging drum 11. The housing A is adapted to be secured to the lower edge of an instrument board 12 or other support, the roller 10 and drum 11 serving alternately to wind in and pay out a flexible map 13, thus likening the map to a scroll, any given portion of which may be displayed between the rolled ends thereof.

The housing A is formed from a sheet metal blank. It includes a back 14, ends 15, 15ª turned forwardly from said back, a cover 16 reaching forwardly from the upper edge of the back, thence downwardly to form a roll protecting canopy, a bracket 17 turned rearwardly from the lower edge of said back and hangers 18 turned downward at the ends of the bracket. The housing A is applied to the instrument board 12 of an automobile as best shown in Fig. 3, the back 14 of said housing resting against the lower margin of the board, the bracket 17 being clamped against the lower edge of said board by means of anchoring screws 19 threaded therein and reaching through transverse slots 20 in the bracket 17. The roller 10 is a sleeve-like structure having a slot 10ª extending longitudinally thereof. It includes bushings 21 fixed in its ends and journaled on a roller shaft 22 revolubly mounted in the ends 15, 15ª of the housing A. A helical spring 23 encircles the shaft 22 within the roller 10. One extremity of said spring is inserted through a transverse bore 22ª in the shaft 22 and the other extremity thereof is turned outward through the slot 10ª in the roller 10, thus securing one end of the spring with respect to the shaft and the other end thereof with respect to the roller. A knob 24 fixed to the shaft 22 outside of the housing A supplies means for turning said shaft and thereby tensioning the spring 23. On the shaft 22 between the end 15 and the adjacent extremity of the roller 10 is a ratchet wheel 25 (Fig. 4) and associated therewith is an upright pawl 26, pivoted at its lower extremity on said end 15 of the housing. The upper extremity of said pawl extends through a slot 27 in the cover 16 of the housing A and supplies a finger piece 26ª for disengaging the pawl 26 from the ratchet wheel 25 against the action of a spring 28 stretched between said pawl and the end 15 of the housing. The pawl 26 and ratchet wheel 25 normally operate to secure the shaft 22 against rotation by the action of the spring 23, whereby tension in said spring is retained. The finger piece 26ª provides for manually disengaging the pawl 26 from the ratchet wheel 25 and thereby releasing the spring 23, which, when unrestrained spends itself. Cloth backed maps bound at their ends with ordinary metallic binding strips 13ª are best suited for use in the form of holder illustrated. The upper extremity of a map is inserted in the slot 10ª in the roller 10 and the binding strip 13ª thereon being wider than said slot 10ª is drawn into position (Fig. 3), wherein the inner shoulder of said strip fulcrums against a wall of the slot 10ª and the opposite edge of the strip bears against the inner wall of the roller 10. By turning the knob 24, an initial securing turn of the map is brought over the slot 10ª to hold the strip 13ª in place therein. Continued rotation of said knob 24 winds the spring 23 and when the same is sufficiently tensioned it serves to turn the roller 10 and wind the map 13 thereon.

A tab (not shown) may be detachably applied to the lower end of the map to supply a finger hold for manipulating the same and to provide a stop engageable with the rolled portion of the map and the back 14 of the housing. In a map proportioned to suit given dimensions of the housing A, the lower binding strip 13ª acts as a stop to arrest the rotation of the roller 10 when the map is entirely wound up. In such case, the use of a tab as a stop is not required. In changing maps, the finger piece 26ª is pressed backward to release the spring 23. With the roller 10 free from the action of said spring, the map 13 thereon is readily drawn therefrom and a new one applied, the attachment of the new map and the re-tensioning of the spring 23 being carried out as above explained.

The frame b of the reel B comprises two arms 28 joined by a cross brace 29. Each arm is pivoted on a bolt 30 (Fig. 2) passing through the upper end thereof and through an aperture 18ª in a hanger 18 on the housing A. Wing nuts 31 threaded on said bolts 30 bear against their companion hangers 18. Each wing nut 31 tensions a spring 32 interposed between the head 30ª of its respective bolt 30 and frame arm 28 and said springs operate to frictionally secure the frame b in any of its various angular positions. The winding drum 11 is a sleeve-like structure having a longitudinal slot 11ª therein and trunnions 33, 33ª at its ends journaled in the free ends of the arms 28. A button 34 fixed to the trunnion 33 provides for conveniently turning the drum 11 against the frictional holding action of a spring 35 encircling said trunnion 33 and interposed between one end of the drum 11 and the adjacent arm 28. The free end of a map 13, wound on the roller 10 is connected with the drum 11 and its attachment thereto perfected in the manner of the described attachment of the upper end of the map 13 to said roller. With the map stretched between the roller 10 and drum 11, it may be taken in on the latter or paid back to the former, thus presenting any desired portion of the map in the reach between said roller and drum. The extreme positions of the frame b are shown in Fig. 3. From the forward position (solid lines), with the gracing shoulders 28ª (Fig. 3) bearing beneath the flange 17, the frame b may be swung into horizontal position of disuse (dotted lines) beneath the instrument board 12. Thus it will be understood that the reel B with or without the map attached thereto may be variously positioned, as desired.

Changes in the specific form of my invention, as herein disclosed, may be made within the scope of what is claimed without departing from the spirit of my invention.

Having described my invention, what I claim as new and desire to protect by Letters Patent is:

1. The combination with a flexible map having metallic binding strips at the ends thereof, of a housing, a roller shaft journaled in the ends of the housing, a sleeve-like roller journaled on said roller shaft within the housing, said roller having a slot longitudinally thereof, a helical spring encircling the roller shaft within the roller, one end thereof being fixed to said roller and the other end thereof to said roller shaft, a knob fixed on the roller shaft for turning the same, a ratchet wheel fixed to said roller shaft, a spring pressed pawl on the housing co-operating with said ratchet wheel and normally acting to prevent rotation of said shaft in a direction to unwind said spring, a finger piece for freeing the pawl from engagement with the ratchet wheel, the slot in said roller being adapted to receive the upper binding strip of the map and said roller being adapted to be turned initially through said knob, spring and shaft to bring a turn of the map into position over said binding strip and thereby perfect the attachment of said map to the roller, said spring being adapted to be tensioned through the knob and roller shaft and released through the medium of said finger piece, a reel comprising a frame hinged to said housing and a sleeve-like drum frictionally journaled on said frame, said drum being slotted to receive the lower end of the map and a button for turning the drum to unwind a map from the roller and take it in, also to pay out said map to said roller, whereby any portion of said map between the ends thereof may be displayed under tension between said roller and drum.

2. In a device of the class described, a body structure, a spring actuated roller mounted thereon and adapted to wind in a flexible map and yieldingly permit of the unwinding of the same therefrom, a reel including a frame and a drum thereon to unwind the map from said roller and take in the same, also to pay out said map to said roller, and means for detachably mounting said frame in yieldingly tiltable relation on said body structure.

3. In a device of the class described, a body structure, a spring actuated roller journaled therein and adapted to wind in a flexible map and yieldingly permit of the unwinding of the same therefrom, and a reel including a frame and a drum carried by said frame to unwind the map from said roller and take in the same, also to pay out said map to said roller, whereby any desired portion of the map may be exposed, said frame being hinged on the body structure to permit of the placement of the exposed portion of said map at different angles.

4. In a device of the class described, a spring actuated roller adapted to wind in a flexible map and yieldingly permit of the unwinding of the same therefrom, and a reel including a yieldingly tiltable frame and a frictionally revoluble drum carried thereby and adapted to unwind the map from said roller and take in the same, also to pay out said map to said roller.

5. The combination with a flexible map having a metallic binding strip at one end thereof, of a housing, a roller shaft journaled in the ends of the housing, a sleeve-like roller journaled on said roller shaft within the housing, said roller having a slot longitudinally thereof, a helical spring encircling the roller shaft within the roller, one end thereof being fixed to said roller and the other end thereof to said roller shaft, a knob fixed on the roller shaft for turning the same, a ratchet wheel fixed to said roller shaft, a spring pressed pawl on the housing co-operating with said ratchet wheel and normally acting to prevent rotation of said shaft in a direction to unwind said spring, a finger piece on said pawl for freeing the same from engagement with the ratchet wheel, the slot in said roller being adapted to receive the binding strip on the map and said roller being adapted to be turned initially through said knob, spring and shaft to bring a turn of the map into position over said binding strip and thereby perfect the attachment of said map to the roller, said spring being adapted to be tensioned through the knob and roller shaft and released through the medium of said finger piece, the spring, when tensioned, causing the roller to wind in the map.

6. The combination with a flexible map having a binding strip at one end thereof, of a housing, a shaft journaled therein, a sleeve-like roller formed with a slot longitudinally thereof, said roller being journaled on said shaft and designed for the winding of a map thereon, a helical spring encircling the shaft, one end of the spring being fixed to the roller and the other end thereof to said shaft, means for turning the shaft, ratchet mechanism normally holding the shaft against rotation by the action of the spring, said mechanism being manually operable to free said spring, the slot in said roller being wider than the thickness, but narrower than the width of the binding strip on the map, and adapted to receive said strip edgewise said shaft turning means providing for the initial rotation of the shaft to carry a securing turn of the map over the binding strip in said slot and for subsequent rotation of the shaft to tension said spring.

7. In combination, a flexible map, a securing member at one end thereof, a roller for winding in and paying out said map, said roller having a slot therein adapted to receive said securing element upon the application of said end of said map to said roller laterally thereof, and means for turning the roller, said means providing for the initial rotation of said roller to carry a securing turn of the map over the slot therein.

In testimony whereof, I have signed my name to this specification.

JOHN T. JOHNSON.